No. 615,550. Patented Dec. 6, 1898.
LA MOTT HAWKINS.
SELF REGULATING VALVE.
(Application filed Mar. 7, 1898.)
(No Model.)
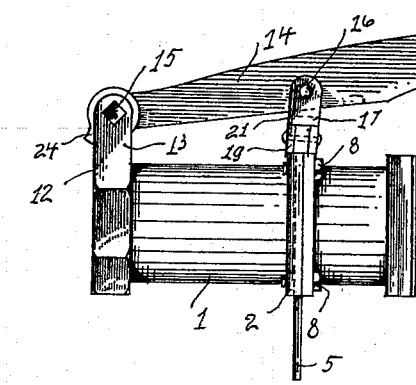
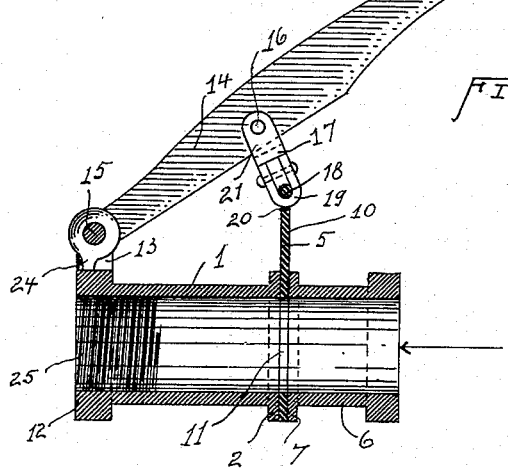
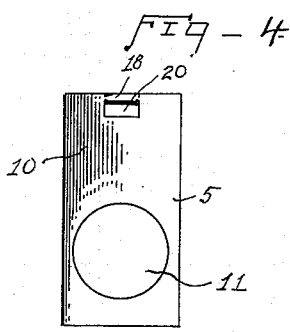
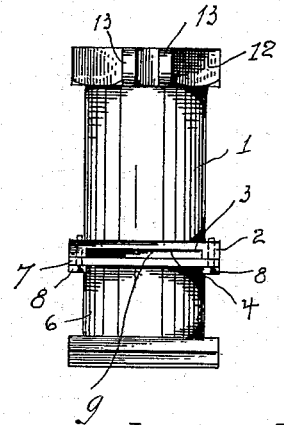
Witnesses
Inventor
La Mott Hawkins
By William Webster
Atty.

UNITED STATES PATENT OFFICE.

LA MOTT HAWKINS, OF PRAIRIE DEPOT, OHIO.

SELF-REGULATING VALVE.

SPECIFICATION forming part of Letters Patent No. 615,550, dated December 6, 1898.

Application filed March 7, 1898. Serial No. 673,018. (No model.)

*To all whom it may concern:*

Be it known that I, LA MOTT HAWKINS, a citizen of the United States, residing at Prairie Depot, in the county of Wood and State of Ohio, have invented new and useful Improvements in Self-Regulating Valves, of which the following is a specification.

My invention relates to float-operated valves, and contemplates the provision of such a valve, designed more particularly for use in conjunction with an oil-tank and a pipe leading therefrom to the pump of a pipe system, the said valve being adapted to automatically cut off communication between the tank and pipe when the fluid in the former registers a minimum depth, so as to prevent the objectionable entry of air and gas into the pipe and being constructed with a view of preventing grit, sand, gum, and other solid or semisolid substance in the oil from interfering with it closing perfectly.

With the foregoing in view the invention will be fully understood from the following description and claims when taken in conjunction with the annexed drawings, in which—

Figure 1 is a side elevation with the float omitted and the valve proper in its closed position. Fig. 2 is a sectional view with the valve proper in its open position and the float shown by dotted lines. Fig. 3 is a plan view of the valve body or casing. Fig. 4 is a detail elevation of the valve proper removed.

In the said drawings similar figures designate corresponding parts in all of the several views.

The valve body or casing is of a general cylindrical form and is made up of an outer section having threads 25 at one end for the engagement of a pipe (not shown) and a flange 2 at its inner end, and an inner section 6, having a flange 7 meeting the flange 2 of the outer section and connected thereto by bolts 8. In the flange 2 of the outer section 1 is a groove or recess which, in conjunction with the contiguous end of the section 6, forms a vertically-disposed way 9 for the vertically-movable valve proper, 5, the said way being open at its lower and upper ends, as best shown in Fig. 2, for an important purpose presently described.

The valve proper, 5, which is flat and rectangular in form, is designed to seat against the transverse wall 4 of the valve-receiving way 9, and is provided with a port 11, designed to coincide with and effect communication between the bores of the sections 1 6, an imperforate portion 10, arranged above the port and designed to close communication between the said bores, a slot 20 above the imperforate portion 10, and a bar 18, of circular form in cross-section, forming the upper wall of the slot. This bar 18 of the valve proper is designed for the engagement of the U-shaped portion 19 of a link 17, which U-shaped portion 19 extends loosely through the slot 20 and is connected to the body of the link 17 by bolts, as shown. The link 17 is bifurcated at its upper end to receive a lever 14, to which it is pivotally connected by a transverse bolt 16.

As best shown in Fig. 2, the lever 14 is provided at one end 22 with a suitable float 23. Its other end is connected by a bolt 15 to lugs 13 on a flange 12 of the body-section 1 and is provided with a stop-lug 24, designed to engage the said flange and thereby limit the upward movement of the end carrying the float. This is advantageous, because it insures the valve being open to the fullest extent when there is sufficient fluid in the tank to hold the float in the position shown in Fig. 2 and retains the parts in such position as to enable the valve proper to promptly assume its closed position as soon as the fluid falls sufficiently to enable the float to move downwardly.

When the valve proper falls and assumes its closed position, the pressure being in the direction indicated by arrow in Fig. 2 will hold it against its seat 4, and hence the escape of air and gas after the oil is removed from the tank will be effectually prevented, and a great saving of gas, which would otherwise be wasted, will be effected.

It is essential to the proper seating of the imperforate portion 10 of the valve proper against the valve-seat 4 that the said seat be free from all sand, grit, gum, or other solid or semisolid substance. This is insured by the movement of the valve proper in either direction, which progressively removes all of the substances named from the wall or valve-seat 4 and prevents the same from interfering with the perfect seating of the valve.

The open ends of the valve-receiving way permit of the escape of the sand, grit, gum, and other substances from the body or casing and materially diminish the liability of the same interfering with the proper seating of the valve.

In practice the valve is arranged in an oil-tank and is connected to a pipe leading out of the same and forming part of a system connected with a pump.

The valve may also be used to advantage in conjunction with an oil and gas separator.

It will be appreciated from the foregoing that with all of its advantages the valve is extremely cheap and simple and embodies no complicated parts such as are likely to get out of order after a short period of use. It will also be appreciated that after permitting oil to escape from a tank the valve will automatically close, and thus hold the gas in the tank, from whence it may be taken and used as fuel in steam-boiler and other furnaces.

Having described my invention, what I claim, and desire to secure by Letters Patent, is—

1. In a self-regulating-valve mechanism, the combination of a body comprising a section having a flange at one end recessed to form a valve-receiving way, and another section having a flange secured to the recessed flange portion of the first-named section, the valve proper having an imperforate portion and a port of a diameter corresponding to the bores of the body-sections, a float-lever pivotally connected to the body, and a link connecting the valve proper and the float-lever, substantially as specified.

2. In a self-regulating-valve mechanism, the combination of a body comprising an outer section and an inner section, one of which is recessed or grooved to form a valve-seat and a valve-receiving way when the sections are connected together, means connecting the sections, the vertically-movable valve proper having the imperforate portion and the port of a diameter corresponding to the bore of the body-sections, and the float-lever fulcrumed at one end to the body and connected with the valve proper and having a stop-lug at its fulcrumed end arranged to engage the body when the float is raised and the port of the valve proper is coincident with the bores of the body-sections, substantially as specified.

3. In a self-regulating-valve mechanism, the combination of a body having a bore and a vertically-disposed valve-receiving way intersecting said bore and open at its upper and lower ends, the valve proper movable in said way and having the port and the imperforate portion, and a float-lever pivotally connected to the body and loosely connected to the valve proper, substantially as specified.

4. In a self-regulating-valve mechanism, the combination of a body having a bore and a vertically-disposed, valve-receiving way intersecting said bore and open at its upper and lower ends, the valve proper movable in said way and having the port and the imperforate portion, and a float-lever pivotally connected to the body and loosely connected with the valve proper and having a stop-lug arranged to engage the valve-body when the port of the valve proper is coincident with the bore of the said body, substantially as specified.

LA MOTT HAWKINS.

Witnesses:
B. JOHNSON,
W. H. BOWER.